Figure 1:
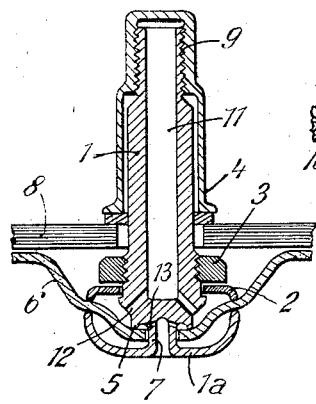

June 13, 1939. O. BOTHE 2,162,603

VALVE FOR TIRES AND THE LIKE

Filed May 20, 1937 2 Sheets-Sheet 1

Inventor:
O. Bothe
By Bascock Downing Herbold
Attys

June 13, 1939.  O. BOTHE  2,162,603
VALVE FOR TIRES AND THE LIKE
Filed May 20, 1937   2 Sheets-Sheet 2

Inventor:
O. Bothe

Patented June 13, 1939

2,162,603

UNITED STATES PATENT OFFICE 2,162,603

VALVE FOR TIRES AND THE LIKE

Otto Bothe, Dusseldorf, Germany

Application May 20, 1937, Serial No. 143,823
In Germany May 27, 1936

10 Claims. (Cl. 251—119)

This invention relates to valves for pneumatic tires and the like.

Numerous tire valves are already known but constructions hitherto known are in part fairly complicated and in part not fully airtight, as is shown by the necessity of having to pump up at longer or shorter intervals even in the case of perfectly new tubes. Amongst others valve constructions are known in which an elastic sealing member, usually a membrane, presses against a seating but neither has this type of valve turned out to be completely satisfactory as the sealing member is often unable to close entirely owing to too little pressure against the seating.

The subject of the invention is a valve having an elastic sealing member in which the faults of known valves of this type have been eliminated. This is achieved by the fact that before the tire is filled the sealing member rests against the seating with an initial pressure, is pierced (or provided with an aperture) within the seating and with the body of the valve forms a space outside the seating, such space being connected with the inlet aperture through which the air is pumped.

In consequence of the initial tension the sealing member presses against the valve seating even when there is no pressure or only slight pressure inside the tube. With strong internal pressure the initial tension acts as a supplementary sealing force.

Further in consequence of the construction of the sealing member according to the invention the pressure acting on the valve seating is much greater than is necessary for the area of the valve seating, as that part of the sealing member which together with the valve body forms a space also adds to the pressure acting on the valve seating as will be explained later in greater detail.

It is of advantage when a part of the tube itself is formed as the sealing member, for reinforcing bodies to be provided in the vicinity of the aperture in the tube.

The member which dams back the air can be held stretched between two clamping members. This is particularly advantageous when done in such a manner that the clamping member inside the tube is constructed as a special part separate from the valve seating body and can then be pressed against the external clamping member by suitable means.

By this means there is a saving of special devices for fastening the valve to the tube and the rim as the parts holding the sealing member stretched at the same time offer the means necessary for fastening the valve. In consequence the fastening device is attached only to the tube and is pressed against the rim by the pressure within the tube, while the supports for the pump project freely through the rim and thus any special device for fastening the valve unto the rim is unnecessary.

The means for placing the part of the tube forming the sealing member onto the seating with an initial pressure can be constructed in various ways. For instance the clamping member in the interior of the tube can be screwed or jammed into a corresponding aperture in the seating member. In the first case the inner clamping member can be screwed into the body of the seating member eccentrically and a pin can be pushed through the part thus left free, which will permit of the elastic sealing member being pushed back and of the valve being easily opened. The supports for the pump can be constructed as a special part and if necessary be connected movably (as a joint) with the seating member, so as to be able to utilise the valve for rims and pumps of various types without difficulty.

Any suitable material can be used for the construction of the valves, but particularly light metals. Further the valve housing itself can be of elastic material and a seating member of non-elastic material can be inserted in the housing.

In the accompanying drawings several methods of carrying out the invention are shown. The figures show as follows:

Fig. 1 a longitudinal cross section of the valve.

Figure 2:
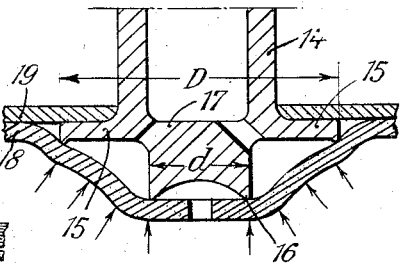

Fig. 2 a cross section through the foot of the valve on a large scale showing the operation of the valve.

Figure 3:
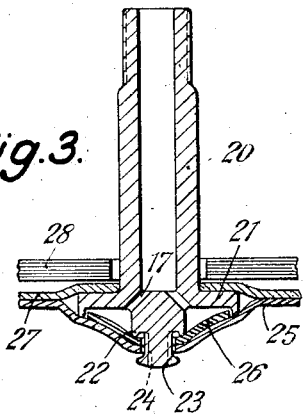

Fig. 3 a second method for carrying out the invention.

Figure 4:
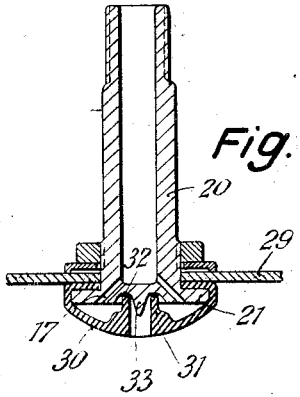

Fig. 4 a third method in which contrary to the methods already given the sealing member is not composed of the tube but of a special part.

Figure 5:
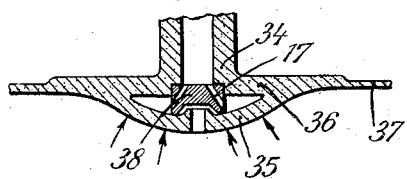

Fig. 5 a further method in which a special valve seating member of non-elastic material is inserted in an elastic valve housing.

Figure 6:
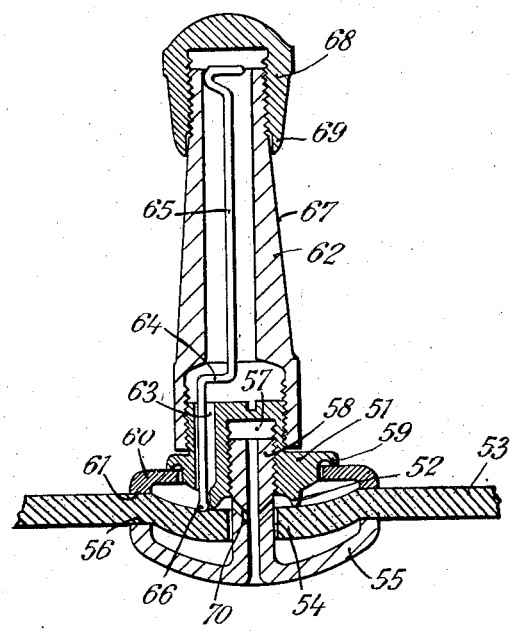
Figure 7:
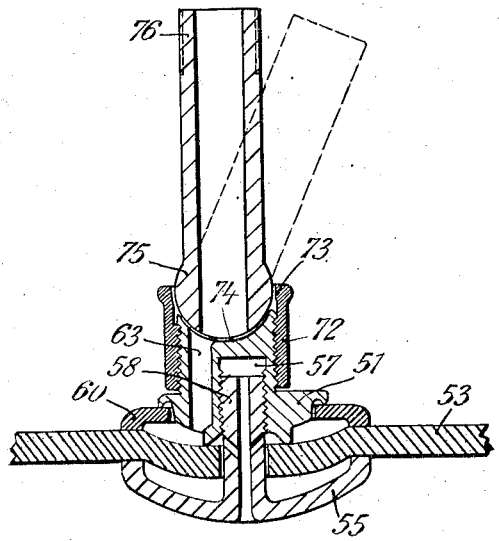

Fig. 6 a method in which the elastic sealing member is held stretched between two special clamping members and Fig. 7 a method which differs from that in Fig. 6 in the construction of the supports for the pump.

The valve shown in Fig. 1 consists of a hollow stem 1 with the foot 1a, the pressure plate 2, the nut 3 and the cap 4. Within or above the foot 1a the valve seating 5 is formed integrally with the stem 1 and on this lies the tube 6 which is held fast between the parts 1 and 2 with the help of the pressure plate 2 and the nut 3. Owing to the form given to the stem 1 and to the remaining parts the tube 6 receives thereby a certain initial tension within the foot 1a and plate 2. The tube 6 has an aperture in it so that it can be passed down the stem on to the hollow foot 7. 8 is the rim on which the cap rests being screwed on to a thread 9 of the hollow stem 1 a washer being placed between the rim and the cap so that the cap forms a safety nut against the rim 8 and a special rim nut can be dispensed with.

The air to be pumped in passes through the channel 11 which ends in the oblique channels 12. These open into a space which is formed between the tube 6 acting as sealing member and the cap-shaped pressure plate 2. Owing to the pressure from the pump the tube 6 is raised from its seating 5. The air can then get through the apertures 13 and the hollow foot 7 into the interior of the tube 6. At the end of the pump stroke the wall of the tube 6 returns to the seating 5 owing to the internal pressure and the pressure from the initial tension.

In the method according to Fig. 2 the stem 14 has a foot 15, a valve seating 16 and inlet apertures 17. The tube 18 has where the valve is situated a reinforcing body 19 vulcanized thereon. When the tube is inflated the compressed air therein exerts a pressure against the tube in the direction of the arrows so that the tube is pressed against the annular seating 16.

By virtue of the greater area D defined by the flange 15, than the area d of the valve seat 16, and the atmospheric pressure in the annular space or chamber extending therebetween, the internal pressure of the inflated tube 18 will distend the latter across the above-mentioned chamber and tightly hold the tube against the seat 16.

The method according to Fig. 3 shows an arrangement in which a pressure plate 2 and a nut 3 are unnecessary. On the contrary this method consists of a stem 20 with a foot piece 21 and a seating 22. The end 23 of the stem is passed through an aperture in the tube 25 and has air channels 24. To prevent the aperture being widened a special reinforcing ring 26 can be provided. Further a flap 27 can be vulcanized onto the tube to rest above the foot piece 21.

Owing to the absence of the washer and the nut the tube rests directly by this method against the rim 28 much closer to the valve stem whereby leakage owing to distortion at the foot of the valve is avoided. The foot of the valve can also be adapted to the natural form of the tube.

In the method according to Fig. 4 it is not the tube 29 itself which forms the sealing member but a special hood-like sealing member 30 made of rubber is provided, being firmly clamped between the tube wall and the foot 21 of the valve stem and having a central projecting portion 31 having a central boring. As a centering device a pin 33 on the foot 21 fits into this projecting portion 31. The upper annular edge of the projecting portion 31 is pressed thus with an initial tension into an annular groove 32 of the foot of the valve so that the upper edge of the projecting portion forms the actual valve seating.

The formation of the seating can also be carried out vice versa in such a manner that the part 32 of the valve is arranged not as a groove but as already described as a projecting seating.

Fig. 5 shows a method in which the valve stem 34 with the foot of the valve 35 and a tire plate 36 are composed of elastic material. The tire plate 36 is attached to the tire 37 by means of vulcanization for instance. The seating member 38 is composed of a rigid material inserted between the elastic parts 35 and 36. In principle the manner of operation of this method is the same as for those described above.

The opening of the valves shown in Figs. 1–5 is undertaken with the aid of a pin passed through the hole 12 or 17 with the help of which the sealing member can be pressed back from the valve seating at one or at several points in the vicinity of the edge of the seating.

In the method according to Fig. 6 a special valve seating member 51 is provided with a valve seating 52. 53 is the wall of the tube which serves as elastic sealing member and has a hole at the point 54. 55 is a clamping member in the interior of the tube having a clamping edge 56. This clamping member 55 is screwed into a boring 57 in the seating member 51 by means of a plug 58. The inner clamping member 55 works jointly with an exterior clamping member 60 the clamping edge of which is marked 61 and which butts against an annular flange 59 of the seating member 51. The seating member 51 should preferably be provided with an eccentric boring 57 although this may be central. The pump support 62 constitutes a special part which is screwed onto the seating member 51 or onto the exterior clamping member 60. The hole in the rim through which the pump support passes thus forms a safety nut preventing the seating member 51 from turning loose from the clamping member 55 when the boring is eccentric. In the seating member 51 and beside the boring 57 a second boring, groove or the like 63 is provided. Through this and the pump support 62 is passed a pressure pin 65 with a dog's leg 64, the end of which 66 engages with the tube 53 in the vicinity of the valve seating 52. As soon as the pin 65 is pressed the elastic part of the tube 53 is in consequence raised but only in the vicinity of the point of pressure. The valve can thus be opened with only a small expenditure of force even against heavy internal pressure for the purpo e of letting out the air or testing the pressure, the air passing through the borings 70 which leads to a channel in the plug 58. It is through these borings 70 that the air reaches the interior of the tube when it is being pumped up, as the air which reaches the space formed between the tube and seating member or clamping member 60 through the support 62 and the boring 63 can in consequence of the over pressure thus arising raise the tube from the valve seating 52, so long as a pump stroke of corresponding force lasts.

The pump support 62 is sealed by a cap 68. This should be so constructed that it can be screwed so far onto the conical part 67 of the pump support that its cylindrical edge 69 contacts with the conical part 67. By this means the dust cap 68 is securely fastened onto the pump support. The dust cap may also be of elastic material.

The point of tension between the clamping edges 56 and 61 is at the same time the only fastening of the valve, the pump support of which projects free through the hole in the rim. A special fastening of the valve onto the rim is not necessary as the internal pressure of the tube presses the foot of the valve onto the rim.

It is possible owing to the construction of the pump support as a special part to use various shapes of support on the same valve. This is of special importance for motor tires; for these pneumatic tubes with valves ready mounted must be kept in stock. The tubes themselves mostly have the same profile, whereas the rims on the various makes of cars are different. Thus a pump support corresponding to the type of construction of the rim is screwed onto the standard valve.

In the method shown in Fig. 7 a nut 72 is screwed onto the seating member 51 having at 73 a spherical boring. The top side 74 of the seating member 51 is of corresponding spherical formation. The surfaces 73 and 74 form linings of bearing for a universal joint 75 of the pump support 76. This can be swung in any direction as indicated by the dotted lines which is of advantage in the case of unavoidable relative movements of the tube against the rim. In the case of such movements the pump support will yield without the tubes being strained in the vicinity of the point of tension. In this way danger of the tubes being torn is eliminated.

The invention is not limited to the methods described above; there are further numerous methods possible within the scope of the invention.

I claim:

1. A valve for the inner tube of pneumatic tires or the like, comprising a hollow valve stem forming an inlet opening, a valve seat on the inner end of said valve stem, an elastic sealing member engageable with said valve seat and forming a chamber surrounding said valve seat in communication with said inlet opening, a bore in said sealing member within the zone defined by said valve seat and adapted for communication with the interior of said tube, and means for holding said sealing member against said valve seat with an initial pressure before inflation of said tube.

2. A valve according to claim 1 characterized by the fact that the holding means comprises a bulged formation on the sealing member.

3. A valve according to claim 1 including a projection on the valve seat adapted to centralize the sealing member on said seat.

4. A valve according to claim 1 characterised by the fact that the valve stem is of elastic material and the valve seat of non-elastic material.

5. A valve according to claim 1 characterized by the fact that the sealing member comprises a portion of the inner tube to which the valve is attached.

6. A valve according to claim 1 characterized by the fact that the holding means comprises two clamping members for maintaining the sealing member in a stretched condition between them.

7. A valve according to claim 1 characterized by the fact that the holding means comprises a clamping member adapted to be disposed in the interior of the inner tube, said clamping member being constructed separately from the valve seat and means for securing said clamping member to said seat.

8. A valve according to claim 1 characterized by the fact that the holding means for the sealing member comprises an interior clamping member adapted to be eccentrically disposed on the valve seat.

9. A valve according to claim 1 including a pressure pin in said hollow stem adapted to penetrate the valve seat and to engage with the elastic sealing member in the vicinity of the valve seat, for opening said valve.

10. A valve for the inner tube of pneumatic tires or the like, comprising a hollow valve stem forming an inlet opening, a valve seat on the inner end of said valve stem, means for connecting said stem to said valve seat, an elastic sealing member engageable with said valve seat and forming a chamber surrounding said valve seat in communication with said inlet opening, a bore in said sealing member within the zone defined by said valve seat and adapted for communication with the interior of said tube, and means for holding said sealing member against said valve seat with an initial pressure before inflation of said tube.

OTTO BOTHE.